June 17, 1969    R. ROSSELLINI    3,450,019
DEVICE FOR THE REMOTE CONTROL OF AN OBJECTIVE
OF VARIABLE FOCAL LENGTH
Filed May 5, 1967
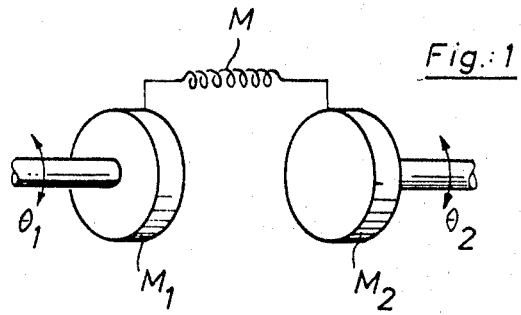
Fig.:1
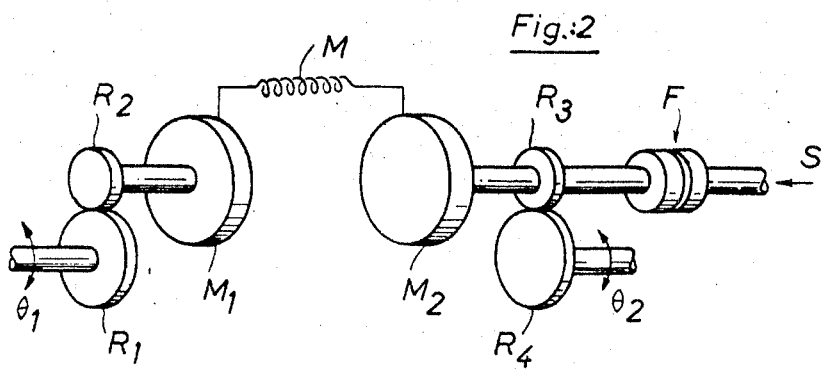
Fig.:2
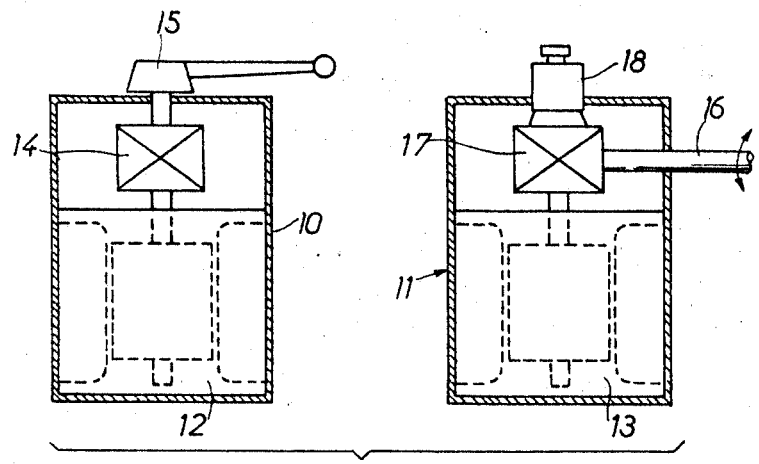
Fig.:3
Inventor
Renzo Rossellini
by Watson, Cole, Grindle & Watson
Attorneys

United States Patent Office 3,450,019
Patented June 17, 1969

3,450,019
DEVICE FOR THE REMOTE CONTROL OF AN OBJECTIVE OF VARIABLE FOCAL LENGTH
Renzo Rossellini, Via Caroncini 52, Rome, Italy
Filed May 5, 1967, Ser. No. 636,465
Claims priority, application Italy, May 5, 1966, 33,194/66
Int. Cl. G03b 3/12
U.S. Cl. 95—45    5 Claims

ABSTRACT OF THE DISCLOSURE

A device for the remote control of an objective of variable focal length (zoom lens) comprises a synchro-transmitter connected to a manual control lever by means of a step-up transmission, and a synchro-receiver connected to the driven element (zoom lens) by a reduction transmission, whereby an adjustable breaking device is associated with the rotor of the synchro-receiver.

---

The present invention relates to a means for the remote control of a mechanical element, with high movement regularity, particularly for the remote control of an objective having variable equivalent focal length.

When it is necessary to transmit a mechanical movement over a distance, there are frequently employed synchronous devices formed by a transmitter and by a receiver which are electrically interconnected.

When an arrangement of this type is used for remotely controlling an objective having variable equivalent focal length (zoom lens), disadvantages are found due to the fact that the torque transmitted between the two machines tends to be cancelled out when they approach the position of synchronism. Actually, a position repeater device, formed by two synchronous machines, can be compared with a mechanical system formed by two turning masses which are coupled by means of a spring. It is a known fact that such mechanical systems are liable to determine oscillations on the side of the driven element and defects in synchronism in the transmission of the position. In addition, when a high degree of regularity of movement of the driven element is required, it is possible to find other disadvantages resulting from hesitations which inevitably occur in the manual movement carried out by the operator.

According to the present invention, in order to obtain a high degree of regularity in movement of the driven element, the rotors of two synchronous machines are connected respectively to the manual control lever and to the driven member by means of a step-up transmission and a reduction transmission, which are respectively mounted on the transmitter and on the receiver, and an adjustable braking device is associated with the rotor of the synchronous receiver. According to one particular embodiment, the two transmission arrangements can have the same transmission ratio.

It is preferred to adapt to one another the electromagnetic torques of the synchronous machines, the moments of inertia of the turning masses, the transmission ratios, the resistance opposed by the load of the receiver and the adjustment of the braking device, so as to obtain a movable system, of which the damping approaches the critical damping.

FIGURE 1 shows a mechanical analogue of the known devices.

FIGURE 2 shows a mechanical analogue of a device according to the invention.

FIGURE 3 shows one embodiment of the transmission by synchronous motors according to the present invention.

If reference is first of all made to FIGURE 1, it is seen that an electromechanical transmission which is effected by means of synchronous machines can be compared with an assembly comprising two turning masses $M_1$, $M_2$, endowed with a certain moment of inertia and coupled by means of a spring M having an elasticity K. The two masses occupy the respective angular position $\theta_1$ and $\theta_2$. These masses $M_1$ and $M_2$ correspond in practice to the mass of the transmitter rotor and of the receiver rotor. The spring M, of which the elasticity is K, represents the forces exerted by the inducing field and by the induced field, which vary substantially in proportion with the difference between the angles $\theta_1$ and $\theta_2$. As is known, these forces tend to be cancelled out, since $\theta_2$ tends to become $\theta_1$.

In practice, it is possible to establish various cases: (a) either the forces of resistance (frictions) acting on the output shaft are very small and there is then observed oscillations around the position of equilibrium of the output shaft, or (b) the forces of resistance acting on the output shaft are very considerable and considerable errors in the final position $\theta_2$ are then established, it being understood that the torque transmitted tends to approach zero when the difference $\theta_1-\theta_2$ decreases.

According to the invention, and as shown by FIGURE 2, the angle $\theta_1$ is transmitted to the synchro-transmitter $M_1$ by means of a step-up transmission formed by the gears $R_1$ and $R_2$, and the output angle $\theta_2$ is obtained from the synchro-receiver $M_2$ by means of a reduction produced by the gears $R_3$ and $R_4$. Positioned on the same shaft as the gear $R_3$ is a friction-type braking device F which is adjustable by means of a thrust S produced, for example, by means of a calibrated spring.

By the adjustment of the braking device F and the appropriate choice of the ratios between $R_1$ and $R_2$, on the one hand, and $R_3$ and $R_4$ on the other hand, this assembly permits of combining the moments of inertia of the turning masses $M_1$ and $M_2$ with the elasticity K of the spring M, so as to obtain an oscillating assembly, of which the damping is very close to the critical damping which, as is known, forms one of the fundamental conditions for obtaining a high dynamic precision.

The regulation of the movement is obtained automatically by means of the inertia of the turning masses $M_1$ and $M_2$, which will make it possible to "filter" the undesirable variations of the force acting on the synchronous machine of the transmitter, in order to obtain a soft and uniform displacement of the driven element. A remote control arrangement of this type has been perfected by the applicant with a view to adapting it to cinematographic cameras in order to control an objective of variable equivalent focal length (zoom lens), when it is essential to obtain a uniform movement of the control shaft of the said objective in order to obtain a satisfactory "travelling-effect."

In one particular embodiment of the invention, as shown in FIGURE 3, the remote control installation comprises casings 10 and 11, in which are respectively arranged a synchro-transmitter 12 and a synchro-receiver 13.

The rotor of the synchro-transmitter 12 is coupled to a control lever 15 by means of a step-up gearing 14. The rotor of the synchro-receiver 13 is coupled to the output shaft 16 by means of a reduction gearing 17. A braking device 18 is associated with the shaft of the rotor of the synchro-receiver 13, in order to make it possible to vary the degree of damping of the device and hence its degree of accuracy. This adjustable device can be made in accordance with any known type, and this makes it unnecessary to give a detailed description thereof in the present case.

In a modified construction (not shown), it is possible to add flywheel-forming masses to the rotors of the synchronous machines in order to increase the moment of inertia thereof, and also possibly damping arrangements of magnetic type.

Although the present invention has been described by reference to one preferred embodiment, it is obvious that numerous variations and modifications can be incorporated therein without, however, departing from the scope of the invention.

I claim:

1. Electromechanical means for the remote control of a mechanical element with a high movement regularity, more particularly for the remote control of an objective of variable equivalent focal length (zoom lens), comprising a synchro-transmitter connected to a control lever and a synchro-receiver connected to the driven mechanical element, characterised in that the rotor of the synchro-transmitter is connected to the control lever by means of a transmission arrangement giving a transmission ratio between the lever and the said rotor which is higher than one, that the rotor of the synchro-receiver is connected to the driven mechanical element by a transmission means giving a transmission ratio between the said rotor and the said element which is lower than one, and that an adjustable braking device is associated with the rotor of the synchro-receiver.

2. Means according to claim 1, characterised in that the two transmission arrangements have the same transmission ratio.

3. Means according to claim 1, characterized in that the electromagnetic torques of the synchronous machines, the moments of inertia of the turning masses, the transmission ratios, the resistance opposed by the load and the adjustment of the braking arrangement, are adapted to one another, whereby a movable system is formed the damping of which approaches the critical damping.

4. Means according to claim 1, characterized in that at least one of the rotors of the synchronous machines has added thereto a mass forming a flywheel in order to increase the moment of inertia of this rotor.

5. Means according to claim 1, characterized in that a damping device of magnetic type is added to at least one of the rotors.

References Cited

UNITED STATES PATENTS 3,283,231   10/1966   Askew   _____ 350—187

NORTON ANSHER, *Primary Examiner.*

R. L. MOSES, *Assistant Examiner.*

U.S. Cl. X.R.

318—30; 350—187